US008478625B2

(12) United States Patent
Gerdes

(10) Patent No.: US 8,478,625 B2
(45) Date of Patent: Jul. 2, 2013

(54) METHOD FOR OPERATING A GAS STORAGE POWER PLANT

(75) Inventor: Ralf Gerdes, Untersiggenthal (CH)

(73) Assignee: Alstom Technology Ltd, Baden (CH)

( * ) Notice: Subject to any disclaimer, the term of this patent is extended or adjusted under 35 U.S.C. 154(b) by 2394 days.

(21) Appl. No.: 10/187,201

(22) Filed: Jul. 2, 2002

(65) Prior Publication Data

US 2003/0033811 A1 Feb. 20, 2003

Related U.S. Application Data

(60) Provisional application No. 60/312,767, filed on Aug. 17, 2001.

(30) Foreign Application Priority Data

Mar. 28, 2002 (CH) ........................................ 0533/02

(51) Int. Cl.
*G06Q 10/00* (2006.01)
*G06Q 30/00* (2006.01)

(52) U.S. Cl.
USPC ........ 705/7.22; 705/7.12; 705/7.23; 705/7.35

(58) Field of Classification Search
USPC .............................. 705/7.12, 7.22, 7.23, 7.35
See application file for complete search history.

(56) References Cited

U.S. PATENT DOCUMENTS

| 3,631,673 A * | 1/1972 | Charrier et al. ............. 60/39.183 |
| 4,189,925 A * | 2/1980 | Long ................................. 60/652 |
| 4,232,997 A * | 11/1980 | Grimmer et al. ................... 417/4 |
| 4,248,043 A | 2/1981 | Stewart, Sr. |
| 4,281,256 A * | 7/1981 | Ahrens et al. ................. 290/1 R |
| 4,849,648 A * | 7/1989 | Longardner ..................... 290/54 |
| 4,873,828 A * | 10/1989 | Laing et al. ..................... 60/659 |
| 5,274,571 A * | 12/1993 | Hesse et al. ................... 700/291 |
| 5,873,251 A * | 2/1999 | Iino ................................. 60/660 |
| 5,924,283 A * | 7/1999 | Burke, Jr. ........................ 60/325 |
| 6,026,349 A | 2/2000 | Heneman |

(Continued)

FOREIGN PATENT DOCUMENTS

| DE | 44 10 440 A | 8/1995 |
| GB | 772287 | 4/1957 |

(Continued)

OTHER PUBLICATIONS

"Ridge Energy Storage Formed to Develop Compressed Air Energy Storage Projects", PR Newswire, May 18, 2000.*

(Continued)

*Primary Examiner* — Kevin Flynn
(74) *Attorney, Agent, or Firm* — Buchanan Ingersoll & Rooney PC

(57) ABSTRACT

The present invention relates to a method for operating a gas storage power plant (1) with at least two turbines (3), with at least two compressors (2) and with at least one gas reservoir (4). The compressors (2) are activated for charging the gas reservoir (4) and are at the same time driven by at least one electric motor (7). The turbines (3) are activated for discharging the gas reservoir (4) and at the same time drive at least one generator (12). In order to improve the operating profitability of the gas storage power plant (1), the number of instantaneously activated compressors (2) and/or turbines (3) depends on the current price at the particular time.

28 Claims, 1 Drawing Sheet

U.S. PATENT DOCUMENTS

| | | | |
|---|---|---|---|
| 6,134,873 A | | 10/2000 | Nakhamkin et al. |
| 6,153,943 A | * | 11/2000 | Mistr, Jr. .......................... 290/52 |
| 6,185,483 B1 | * | 2/2001 | Drees ............................. 700/295 |
| 6,681,155 B1 | * | 1/2004 | Fujita et al. ................... 700/287 |

FOREIGN PATENT DOCUMENTS

| | | |
|---|---|---|
| GB | 1337383 | 11/1973 |
| JP | 07-119485 A | 5/1995 |
| JP | 07-224679 A | 8/1995 |
| JP | 09-250360 | 9/1997 |
| JP | 2000-251931 | 9/2000 |
| JP | 2001-115859 A | 4/2001 |

OTHER PUBLICATIONS

Gavin W. Gaul "Compressed Air Energy Storage Offers Flexibility for Low Cost Providers of Electricity", Presented at the Power-Gen 1995.

English language translation of Japanese Office Action for corresponding Japanese application No. 2002/237064, mailed Oct. 7, 2008.

* cited by examiner

METHOD FOR OPERATING A GAS STORAGE POWER PLANT

This application claims priority under 35 U.S.C. §119 to U.S. Provisional Application No. 60/312,767 entitled COMPRESSED AIR ENERGY SYSTEM and filed on Aug. 17, 2001, the entire content of which is hereby incorporated by reference.

FIELD OF THE INVENTION

The invention relates to a method for operating a gas storage power plant having the features of the preamble of claim 1 and to an associated gas storage power plant.

BACKGROUND OF THE INVENTION

In the paper "COMPRESSED AIR ENERGY STORAGE OFFERS FLEXIBILITY FOR LOW COST PROVIDERS OF ELECTRICITY", presented at the "Power-Gen 1995", Gavin W. Gaul of Westinghouse Electric Corporation, Michael McGill of Texas Power Corporation and Robert W. Kramer, Ph.D of Northern Indiana Public Service Company describe a gas storage power plant. The known gas storage power plant has a turbo group with two turbines, to be precise a high-pressure turbine and a low-pressure turbine, which are drive-connected to a generator. Furthermore, the gas storage power plant may comprise a plurality of compressor groups which can be operated independently of the turbo group and each comprise a compressor capable of being driven by an electric motor. The gas storage power plant possesses, moreover, a gas reservoir which is discharged via the turbo group in order to generate electrical energy and which can be charged with the aid of the compressor groups.

A gas storage power plant of this type is normally tied into what is known as a "Compressed Air Energy Storage System", CAES system in shortened form. The basic idea of a CAES system is seen in transferring excess energy, generated by permanently operated conventional power plants during basic-load times, into the peak-load times by the cut-in of gas storage power plants, in order thereby, overall, to consume fewer resources for the production of electrical energy. This is achieved in that, with the aid of the cost-effective excess energy, air or another gas is pumped under relatively high pressure into a reservoir, out of which the air or the gas can be extracted, as required, in order to generate relatively costly current. This means that the energy is stored retrievably in the form of potential energy. For example, extensive coal or salt mines serve as reservoirs.

In this connection, a gas storage power plant is conventionally operated in such a way that the compressors for charging the gas reservoir are activated during a charging cycle and at the same time are driven by the associated electric motors. In this case, electrical energy is drawn off from the public power supply network. In this charging phase, the activation of the compressor groups takes place as a function of the available electrical energy. For feeding electrical energy into the public network, the turbines for discharging the gas reservoir are activated during a discharge cycle, and they drive the associated generator. The turbo group of the gas storage power plant is conventionally dimensioned as a function of the available gas reservoir, in such a way that as much electrical energy as possible can be fed into the public network over the entire current generation phase. The turbo group is therefore designed in terms of a maximization of the energy capable of being drawn off from the gas reservoir during the current generation phases.

SUMMARY OF THE INVENTION

The present invention is concerned with the problem, as regards a gas storage power plant of the type initially mentioned, of finding a way of improving the operational profitability of the plant.

This problem is solved by means of the subjects of the independent claims. The dependent claims relate to advantageous embodiments.

The invention is based on the general idea of equipping a gas storage power plant with a plurality of compressors capable of being operated independently of one another and/or with a plurality of compressed-air-operated engines, for example turbines, capable of being operated independently of one another, the number of simultaneously operating compressors or simultaneously operating engines being determined by the current price prevailing at the particular time. Thus, in the design of a gas storage power plant, the invention adopts a procedure whereby the design of the engines or the compressors can be adapted more effectively, in terms of dimensioning and number, to the storage capacity of the existing gas reservoir or gas reservoirs. Whereas, in a conventional gas storage power plant for current generation, during the discharge cycle all the turbines are used simultaneously for current generation, in order to provide as constantly as possible a maximum of additional electrical energy for the times of increased current demand, in the plant according to the invention the generation of electrical energy takes place according to other criteria, to be precise in a way which is staggered as a function of the current price prevailing at the particular time. As a result, within the times of increased current demand, there can be differentiation in terms of the current price prevailing at the particular time, the consequence of this being that the operating result of the extraction cycle can be improved.

In a development, the method may be operated in such a way that, at a first current price, at least one compressor is driven by at least one electrical drive device, for example an electric motor. At a second current price which is lower than the first current price, at least one further compressor is driven by at least one electrical drive device, for example an electric motor. At a third current price, which is higher than the first current price, at least one engine, for example, a turbine, drives at least one current generation device, for example a generator. At a fourth current price, which is higher than the third current price, a further engine, for example a turbine, drives at least one current generation device, for example a generator. By virtue of this form of construction, the staggered activation and deactivation of the compressors and of the engines is implemented, the current price being used as the switching variable.

According to an advantageous refinement, it is proposed, for a discharge cycle, to carry out the activation and deactivation of the engines in terms of a maximization of the product of the current price times the delivered current quantity. This means that most current is generated in peak-load times, with maximum current prices, while correspondingly less current is generated in adjacent lower price regions. By means of this procedure, the profit capable of being achieved during current generation can be increased.

Correspondingly, the costs incurred for charging the gas reservoir can be reduced in that, for a charge cycle, the activation and deactivation of the compressors are carried out in terms of a minimization of the product of the current price times the consumed current quantity. This means that all the compressors are activated only in times with the lowest current prices, while one or more compressors can be deactivated in adjacent low-price zones.

A development in which the activation and deactivation of the engines or of the compressors are adapted dynamically to the charge state of the gas reservoir is particularly advantageous. For example, in the event that the gas reservoir is not fully charged, the profit during the discharge cycle can be increased if the engines are activated only in very high current price regions.

Further important features and advantages of the present invention may be gathered from the subclaims, from the drawings, and from the accompanying figure description with reference to the drawings.

BRIEF DESCRIPTION OF THE DRAWINGS

Preferred exemplary embodiments of the invention are illustrated in the drawings and are explained in more detail in the following description. In the drawings, in each case diagrammatically.

DETAILED DESCRIPTION OF THE INVENTION

Figure 1:
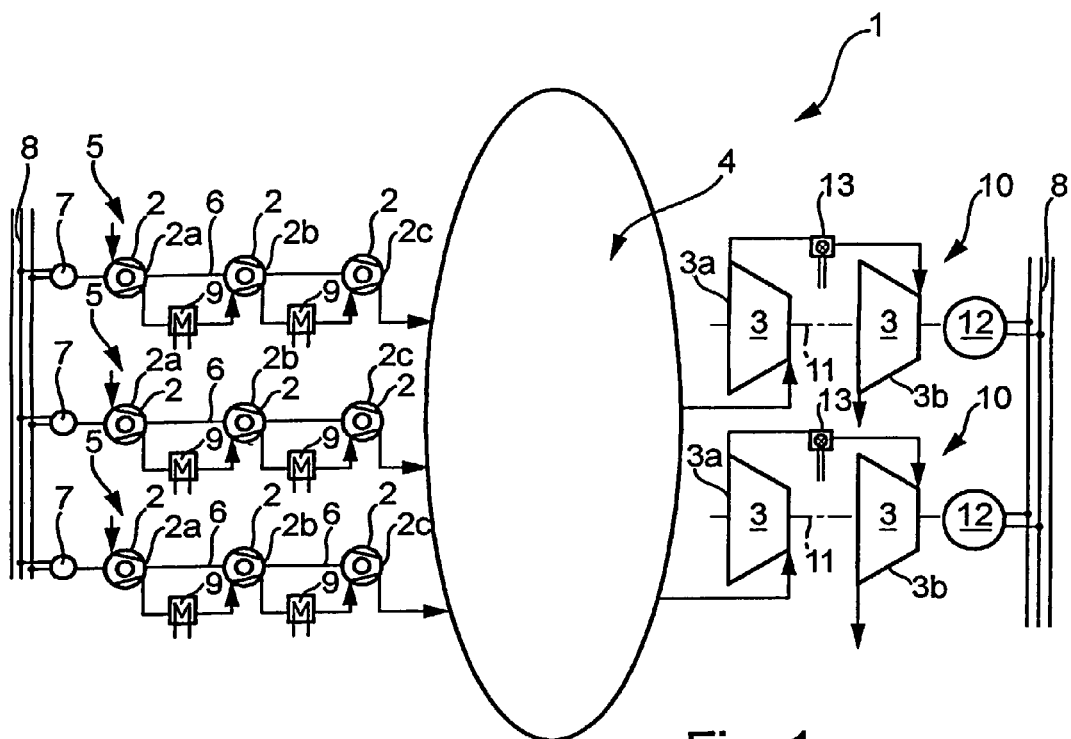
FIG. 1 shows a greatly simplified basic illustration of a gas storage power plant according to the invention.

According to FIG. 1, a gas storage power plant 1 according to the invention comprises a plurality of, here nine, compressors 2 and a plurality of, here four, compressed air-operated engines 3 and a gas reservoir 4. The engines 3 are preferably designed as turbines and are likewise designated by 3 below.

Every three compressors 2 are combined to form a compressor group 5, the three compressors 2 being drive-connected via a common shaft 6 to an electrical drive device 7 assigned to this compressor group 5. Preferably, the drive device 7 is designed as an electric motor and is likewise designated by 7 below. Electric motors 7 are in each case connected to a public power supply network 8. In each compressor group 5, there are three compressors 2 assigned to different pressure stages, so that each compressor group 5 comprises a low-pressure $2a$, a medium-pressure $2b$ and a high-pressure compressor $2c$. Heat exchangers 9 for cooling the compressed gases may be provided between the individual compression stages.

Correspondingly, every two engines 3 form an engine group 10 or every two turbines 3 are combined to form a turbo group 10. The two turbines 3 of the turbo group 10 are connected via a common shaft 11 in each case to a current generation device of the turbo group 10, said current generation device being designed as a generator 12 and being connected to the public power supply network 8. While the turbine 3 first acted upon by the gas of the gas reservoir 4 is supplied directly with the gas, the other turbine 3 is assigned a burner 13 which generates hot combustion exhaust gases for acting upon the following turbine 3. Air is normally used as reservoir gas or as working gas, so that the turbine 3 acted upon by the air forms an air turbine $3a$, while the turbine 3 acted upon by the exhaust gases of the burner 13 constitutes a gas turbine $3b$. Expediently, with the aid of the hot exhaust gases emerging from the gas turbine $3b$, the air supplied to the air turbine $3a$ can be preheated via a recuperator, not illustrated here, in order thereby to improve the overall efficiency of the turbine process.

The gas reservoir 4 could be charged during a charge cycle with the aid of the compressors 2. In this case, the compressors $2a$, $2b$ and $2c$ of a compressor group 5 are jointly activated and deactivated. In contrast to this, the individual compressor groups 5 may be activated and deactivated independently of one another. A charge cycle is then carried out when low-cost current is available via the power supply network 8. Power is then extracted from the power supply network 8 via the electric motors 7 and is used for driving the compressors 2.

For a discharge cycle, the turbines 3 are acted upon directly or indirectly by the gas contained in the gas reservoir 4. In this case, the turbines $3a$ and $3b$ or a turbo group 10 are in each case activated or deactivated simultaneously. The activated turbo group 10, via its shaft 11, drives the associated generator 12 which then generates electrical current and feeds the corresponding power into the power supply network 8. It is particularly important, here too, that the turbo groups 10 can be activated and deactivated independently of one another. A discharge cycle of this kind takes place during the peak-load times.

Figure 2:
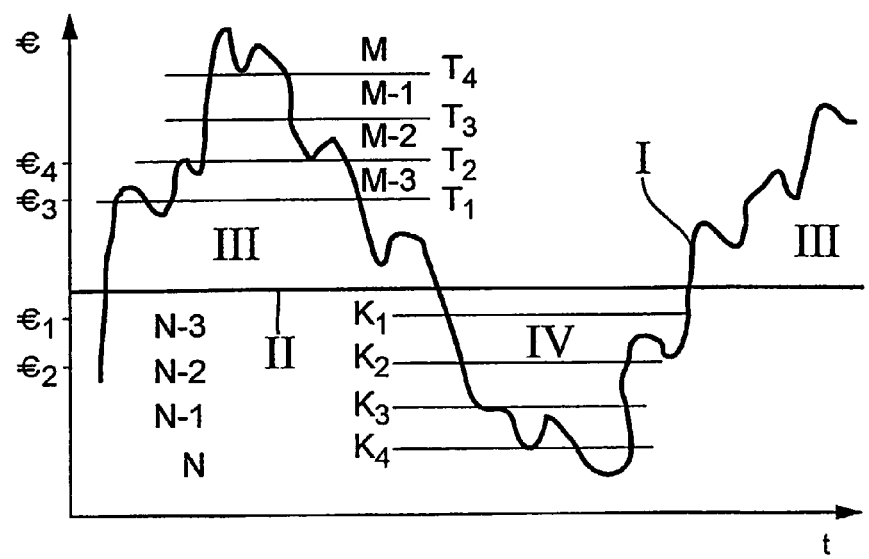
FIG. 2 shows a graph for illustrating an operating method according to the invention.

In the graph according to FIG. 2, the current price, symbolized by the Euro sign €, is plotted on the ordinate and the time t is plotted on the abscissa. As may be gathered from FIG. 2, a profile I of the current price € is exposed to considerable time fluctuations. With respect to an average price level represented by a horizontal line and designated by II, high-price phases III, which lie above the line II, may be differentiated from low-price phases IV, which lie below the line II. The current price € depends strictly on the market economy conditions, that is to say on the relationship between supply and demand. Accordingly, the high-price phases III are correlated with times of increased current demand, for example throughout the day, while the low-price phases IV occur in times with low current consumption, for example at night. It is therefore expedient to place the charge cycles of the gas storage power plant 1 into the low-price zones IV, so that relatively low costs have to be incurred for charging the gas reservoir 4. In contrast to this, the discharge cycles of the gas storage power plant 1 are logically placed into the high-price phases III of the current-price profile I, in order to achieve profits for the plant 1 which are as high as possible.

According to the present invention, then, differentiation is carried out within the high-price phases III and within the low-price phases IV, this being achieved with the aid of current-price thresholds $T_1$ to $T_4$ for turbine activity and with the aid of current-price thresholds $K_1$ to $K_4$ for the compressor activity. In the graph of FIG. 2, said current-price thresholds are represented by horizontal lines $T_1$ to $T_4$ and $K_1$ to $K_4$.

In the exemplary embodiment illustrated in FIG. 2, the gas storage power plant 1 is to have four turbines 3 or turbo groups 10 capable of being activated and deactivated independently of one another. M in this case reproduces the number of independent turbines 3 or turbo groups 10. In the exemplary embodiment, therefore, M=4. Correspondingly, here, the gas storage plant 1 possesses four compressors 2 or compressor groups 5 capable of being activated and deactivated independently of one another. N in this case indicates the number of independent compressors 2 or compressor groups 5, so that, here, N=4. It is clear that the present invention can also be implemented with more or fewer turbines 3 or turbo groups 10 and with more or fewer compressors 2 or compressor groups 5.

The operating method according to the invention works as follows: With a rising current demand, the current price € increases within the high-price phase III according to the profile I. However, as long as the current price € remains below the lowest current-price threshold $T_1$, no turbine 3 or turbine group 10 is activated. As soon as the current price € exceeds this current-price threshold $T_1$, however, the first turbine 3 or turbine group 10 is activated, hence M−3=1 turbines 3 or turbo groups 10 are active. When the next current-price threshold $T_2$ is exceeded, the second turbine 3 or turbine group 10 is activated. The same takes place correspondingly when the next current-price thresholds $T_3$ and $T_4$ are exceeded. After the current-price profile I has exceeded the highest current-price threshold $T_4$, all the turbines 3 or turbo groups 10 of the gas storage power plant are active and generate relatively costly current. With a fall in current demand and a fall in current price, one turbine 3 or turbo group 10 after the other is deactivated again when the current-price threshold $T_4$ to $T_1$ are undershot. Accordingly, the number of instantaneously activated turbines 3 or turbo groups 10 depends on the current price at the particular time. In this case, the higher the current price of a particular time is, the more turbines 3 or turbo groups 10 are activated. By means of this procedure, the potential energy stored in the gas reservoir 4 by the stored gas can be converted to an increased extent profitably into electrical current. Expediently, therefore, for such a discharge cycle, the activation and deactivation of the turbines 3 or turbo groups 10 are carried out in such a way as to result in a maximization of the product of the current price times the delivered current quantity, that is to say a maximization of the earnings.

Correspondingly, in the low-pressure phase IV, the staggered cut-in or activation of the compressors 2 or compressor groups 5 takes place. Above the first current-price threshold $K_1$, none of the compressors 2 or none of the compressor groups 5 is active. Only when the current price € falls further and undershoots the first current-price threshold $K_1$ is the first compressor 2 or the first compressor group 5 activated, in order to commence the charging of the gas reservoir 1. When current prices fall further, further compressors 2 or compressor groups 5 are gradually cut in. Only when the lowest current-price threshold $K_4$ is undershot are all the compressors 2 or compressor groups 5 activated. Correspondingly, with a rising current price, the individual compressors 2 or compressor groups 5 are deactivated in succession again. Accordingly, the number of instantaneously activated compressors 2 or compressor groups 5 likewise depends on the current price at the particular time, the more compressors 2 or compressor groups 5 being activated, the lower the current price at a particular time is. By means of this procedure, the costs incurred in the charging of the gas reservoir 4 can be lowered. Expediently, here too, for a charge cycle, the activation and deactivation of the compressors 2 or compressor groups 5 are carried out in such a way that a minimization of the product of the current price times the consumed current quantity, that is to say a minimization of the expenditures, is established. With minimized expenditure and maximized earnings, the profit of the gas storage power plant 1 and therefore its efficiency can be optimized.

This relation may, moreover, be explained as follows: at a first current price $€_1$, which occurs, for example, at the current-price threshold $K_1$, at least one of the compressors 2 is driven by the associated electric motor 7. At a second current price $€_2$, which is lower than the first current price $€_1$ and which prevails, for example, at the current-price threshold $K_2$, at least one further compressor 2 is driven by the associated electric motor 7. At a third current price $€_3$, which is higher than the first current price $€_1$ and which prevails, for example, at the current-price threshold $T_1$, at least one of the turbines 3 drives the associated generator 12. At a fourth current price $€_4$, which is higher than the third current price $€_3$ and which prevails, for example, at the current-price threshold $T_2$, at least one further turbine 3 drives the associated generator 12.

An embodiment in which the current-price thresholds $T_1$ to $T_4$ and $K_1$ to $K_4$ are adapted dynamically to the charge state of the gas reservoir 4 is of particular interest. This dynamic adaption takes place, in this case, in such a way that the current-price thresholds $T_1$ to $T_4$ selected for the turbine activity are the lower, the fuller the gas reservoir 4 is. In contrast to this, the current-price thresholds $K_1$ to $K_4$ selected for compressor activity are the higher, the emptier the gas reservoir 4 is. This special procedure makes use of the knowledge that a fully charged gas reservoir 4 can be discharged profitably even in the case of relatively low current prices within the high-price zones III, whereas, in an only partially charged gas reservoir 4, it is necessary to wait for higher current prices within the high-price zone III in order to optimize the profit during the discharge cycle. The same applies accordingly to the charge cycle. During the charging of a largely discharged gas reservoir 4, charging must be commenced even at relatively high current prices within the low-price zone IV, whereas, in an only partially discharged gas reservoir IV, it is possible to wait for markedly lower prices within the low-price zone IV.

List of Reference Symbols

1 Gas storage power plant
2 Compressor
2a Low-pressure compressor
2b Medium-pressure compressor
2c High-pressure compressor
3 Turbine
3a Air turbine
3b Gas turbine
4 Gas reservoir
5 Compressor group
6 Shaft of 5
7 Electric motor
8 Power supply network
9 Heat exchanger
10 Turbo group
11 Shaft of 10
12 Generator
13 Burner
I Current-price profile
II Average price level
III High-price zone
IV Low-price zone
$T_1$ to $T_4$ Current-price thresholds for turbine activities
$K_1$ to $K_4$ Current-price thresholds for compressor activities
M Number of independent turbines or turbo groups
N Number of independent compressors or compressor groups
€ Current price
t Time

The invention claimed is:

1. A method for operating a gas storage power plant with at least one gas reservoir, at least one compressed-air-operated engine and at least two compressors, in which the at least two compressors are activated for charging the gas reservoir and at the same time are driven by at least one electrical drive device, and in which the at least one engine is activated for discharge in the gas reservoir and at the same time drives at least one current generation device, wherein a number of compressors or engines which are jointly active depends on a current price at a particular time; wherein, at a first current price, at least one compressor is driven by at least one electrical drive device, at a second current price, which is lower than the first current price, at least one further compressor is driven by at least one electrical drive device, at a third current price, which is higher than the first current price, at least one engine drives at least one current generation device, and at a fourth current price, which is higher than the third current price, at least one further engine drives at least one current generation device.

2. The method as claimed in claim 1, wherein, for a discharge cycle, the activation and deactivation of the engine or engines are carried out in terms of a maximization of the product of the current price times the delivered current quantity.

3. The method as claimed in claim 1, wherein, for a charge cycle, the activation and deactivation of the compressor or compressors are carried out in terms of a minimization of the product of the current price times the consumed current quantity.

4. The method as claimed in claim 1, wherein, the more engines are activated, the higher the current price at the particular time is.

5. The method as claimed in claim 1, wherein the more compressors are activated, the lower the current price at the particular time is.

6. The method as claimed in claim 1, wherein a plurality of current-price thresholds for activating and deactivating the engines are predetermined or predeterminable, at least one of the engines being activated when one of these current-price thresholds is exceeded, and at least one of the engines being deactivated when one of these current-price thresholds is undershot.

7. The method as claimed in claim 1, wherein the plurality of current-price thresholds for activating and deactivating the compressors are predetermined or predeterminable, at least one of the compressors being activated when one of these current-price thresholds is undershot, and at least one of the compressors being deactivated when one of these current price thresholds is exceeded.

8. The method as claimed in claim 6, wherein the current-price thresholds are adapted dynamically to a charge state of the gas reservoir, in such a way that at least one of the following conditions is satisfied: the current-price thresholds for activating and deactivating the engines are lower, the fuller the gas reservoir is; and the current-price thresholds for activating and deactivating the compressors are higher, the emptier the gas reservoir is.

9. The method as claimed in claim 1, wherein at least two engines are combined to form an engine group and are activated and deactivated jointly.

10. The method as claimed in claim 1, wherein at least two compressors are combined to form a compressor group and are activated and deactivated jointly.

11. The method as claimed in claim 1, wherein at least one of the compressed-air operated engines is a turbine.

12. The method as claimed in claim 1, wherein at least one of the electrical drive devices is an electric motor.

13. The method as claimed in claim 1, wherein at least one of the current generation devices is a generator.

14. A gas storage power plant, comprising:
at least one gas reservoir;
at least two compressors configured to be activated and deactivated independently of one another for charging the at least one gas reservoir; and
at least one compressed-air-operated engine for discharging the gas reservoir, wherein the compressors are configured such that a number of the compressors which are jointly active depends on a current price at a particular time; wherein, at a first current price, at least one compressor is driven by at least one electrical drive device, at a second current price, which is lower than the first current price, at least one further compressor is driven by at least one electrical drive device, at a third current price, which is higher than the first current price, at least one engine drives at least one current generation device, and at a fourth current price, which is higher than the third current price, at least one further engine drives at least one current generation device.

15. The gas storage power plant as claimed in claim 14, wherein at least two engines are combined to form an engine group and can be activated and deactivated jointly.

16. The gas storage power plant as claimed in claim 14, wherein at least two compressors are combined to form a compressor group and can be activated and deactivated jointly.

17. A method for operating a gas storage power plant with at least one gas reservoir and at least two compressed-air-operated engines and at least one compressor, in which the at least one compressor is activated for charging the gas reservoir and at the same time is driven by at least one electrical drive device, and in which the at least two engines are activated for discharge in the gas reservoir and at the same time drive at least one current generation device, wherein the number of compressors or engines which are jointly active depends on the current price at a particular time; wherein, at a first current price, at least one compressor is driven by at least one electrical drive device, at a second current price, which is lower than the first current price, at least one further compressor is driven by at least one electrical drive device, at a third current price, which is higher than the first current price, at least one engine drives at least one current generation device, and at a fourth current price, which is higher than the third current price, at least one further engine drives at least one current generation device.

18. A gas storage power plant, comprising:
at least one gas reservoir,
at least one compressor for charging the at least one gas reservoir; and
at least two compressed-air-operated engines configured to be activated and deactivated independently of one another, for discharging the gas reservoir, wherein the engines are configured such that a number of engines which are jointly active depends on a current price at a particular time; wherein, at a first current price, at least one compressor is driven by at least one electrical drive device, at a second current price, which is lower than the first current price, at least one further compressor is driven by at least one electrical drive device, at a third current price, which is higher than the first current price, at least one engine drives at least one current generation device, and at a fourth current price, which is higher than third current price, at least one further engine drives at least one current generation device.

19. The method as claimed in claim 7, wherein the current-price thresholds are adapted dynamically to the charge state of the gas reservoir, in such a way that at least one of the following conditions is satisfied: the current-price thresholds for activating and deactivating the engines are lower, the fuller the gas reservoir is; and the current-price thresholds for activating and deactivating the compressors are higher, the emptier the gas reservoir is.

20. A method for operating a gas storage power plant according to claim 1, wherein the number of compressors activated for charging the reservoir increases as a cost of current lowers and decreases as the cost of current increases.

21. A gas storage plant according to claim 14, wherein the number of compressors activated for charging the reservoir increases as a cost of current lowers and decreases as the cost of current increases.

22. A method for operating a gas storage power plant according to claim 17, wherein the number of engines activated for discharging the reservoir and generating electricity increases as a cost of current increases and decreases as the cost of current decreases.

23. A gas storage power plant according to claim 18, wherein the number of engines activated for discharging the reservoir and generating electricity increases as a cost of current increases and decreases as the cost of current decreases.

24. The method as claimed in claim 1, wherein at least two engines are combined to form an engine group and are activated and deactivated successively.

25. The method as claimed in claim 1, wherein at least two compressors are combined to form a compressor group and are activated and deactivated successively.

26. The method as claimed in claim 17, wherein at least two engines are combined to form an engine group and can be activated and deactivated successively.

27. The method as claimed in claim 17, wherein at least two compressors are combined to form a compressor group and can be activated and deactivated successively.

28. A method for operating a gas storage power plant with at least one gas reservoir, at least one compressed-air-operated engine and at least two compressors, each assigned to a different pressure stage, in which the at least two compressors are activated for charging the gas reservoir and at the same time are driven by at least one electrical drive device, and in which the at least one engine is activated for discharge in the gas reservoir and at the same time drives at least one current generation device, wherein a number of compressors or engines which are jointly active depends on a current price at a particular time; wherein,
- at a first current price, at least one compressor is driven by at least one electrical drive device,
- at a second current price, which is lower than the first current price, at least one further compressor is driven by at least one electrical drive device,
- at a third current price, which is higher than the first current price, at least one engine drives at least one current generation device, and
- at a fourth current price, which is higher than the third current price, at least one further engine drives at least one current generation device.

* * * * *